(12) United States Patent
Adiletta et al.

(10) Patent No.: US 10,070,207 B2
(45) Date of Patent: Sep. 4, 2018

(54) TECHNOLOGIES FOR OPTICAL COMMUNICATION IN RACK CLUSTERS

(71) Applicant: Intel Corporation, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,035

(22) Filed: Dec. 30, 2016

(65) Prior Publication Data

US 2018/0027313 A1 Jan. 25, 2018

Related U.S. Application Data

(60) Provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
H04J 14/00 (2006.01)
H04Q 11/00 (2006.01)
H04B 10/25 (2013.01)

(52) U.S. Cl.
CPC ..... *H04Q 11/0005* (2013.01); *H04B 10/2504* (2013.01); *H04Q 2011/0037* (2013.01)

(58) Field of Classification Search
CPC ...... H04Q 11/0005; H04Q 1/09; H04L 41/12; H04B 10/2504

USPC .......................................................... 398/45
See application file for complete search history.

(56) References Cited

U.S. PATENT DOCUMENTS

| | | |
|---|---|---|
| 2012/0134678 A1 | 5/2012 | Roesner et al. |
| 2015/0098700 A1 | 4/2015 | Zhu et al. |
| 2015/0334867 A1 | 11/2015 | Faw et al. |
| 2016/0007102 A1 | 1/2016 | Raza et al. |
| 2016/0066070 A1 | 3/2016 | Trausch et al. |
| 2016/0231939 A1* | 8/2016 | Cannata ................ G06F 3/0604 |
| 2017/0171061 A1* | 6/2017 | Tessmer ................. H04L 45/16 |
| 2017/0176688 A1* | 6/2017 | Mehrvar .............. G02B 6/3542 |
| 2017/0257970 A1* | 9/2017 | Alleman .............. H05K 7/1489 |
| 2017/0279705 A1* | 9/2017 | Lin ........................ H04L 45/02 |

OTHER PUBLICATIONS

International search report for PCT application No. PCT/US2017038546, dated Oct. 11, 2017 (3 pages).
Written opinion for PCT application No. PCT/US2017038546, dated Oct. 11, 2017 (9 pages).

* cited by examiner

*Primary Examiner* — Don N Vo

(74) *Attorney, Agent, or Firm* — Barnes & Thornburg LLP

(57) ABSTRACT

Technologies for optical communication in a rack cluster in a data center are disclosed. In the illustrative embodiment, a network switch is connected to each of 1,024 sleds by an optical cable that enables communication at a rate of 200 gigabits per second. The optical cable has low loss, allowing for long cable lengths, which in turn allows for connecting to a large number of sleds. The optical cable also has a very high intrinsic bandwidth limit, allowing for the bandwidth to be upgraded without upgrading the optical infrastructure.

25 Claims, 15 Drawing Sheets

TECHNOLOGIES FOR OPTICAL COMMUNICATION IN RACK CLUSTERS

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

A data center may include several racks of computing resources such as servers. The various servers in the datacenter are typically connected to each other through a series of switches. If performing a particular task requires the use of multiple servers, communication may require communicating over a network of several switches.

Communication between servers and racks in data centers is typically carried over copper cables. High-bandwidth copper cables (e.g., cables capable of carrying >10 GHz signals) typically have a high loss per unit length, limiting the length of those cables, which in turn limits the number of racks that can be directly connected to a single switch.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
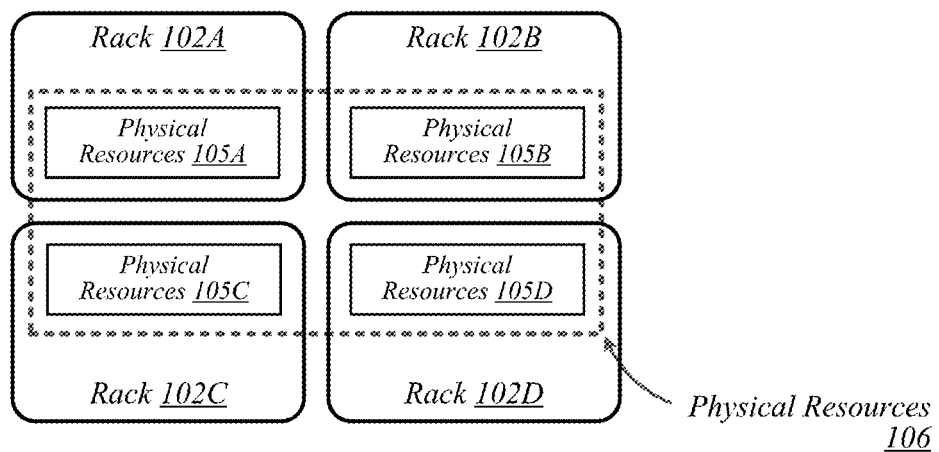
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as Dual In-line Memory Modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, Application Specific Integrated Circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
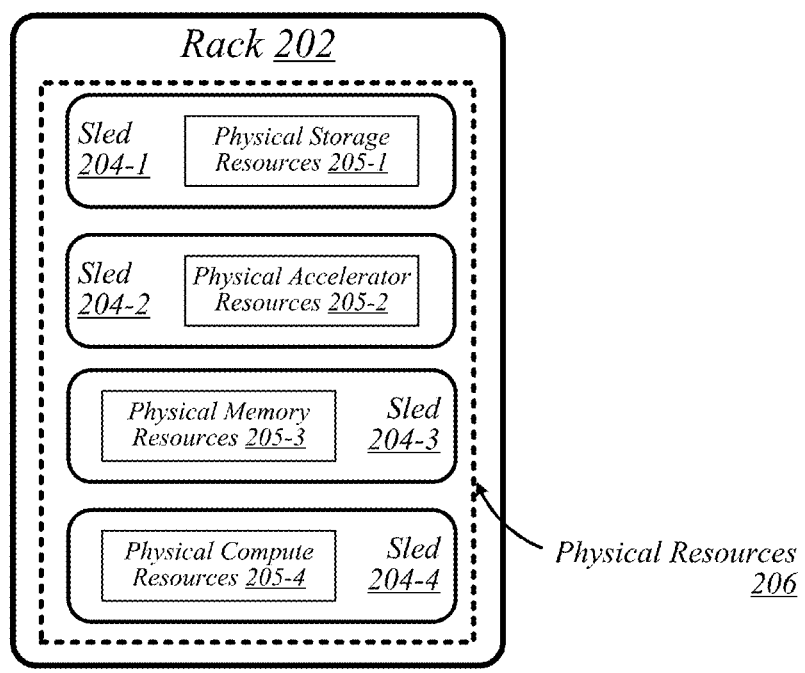
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
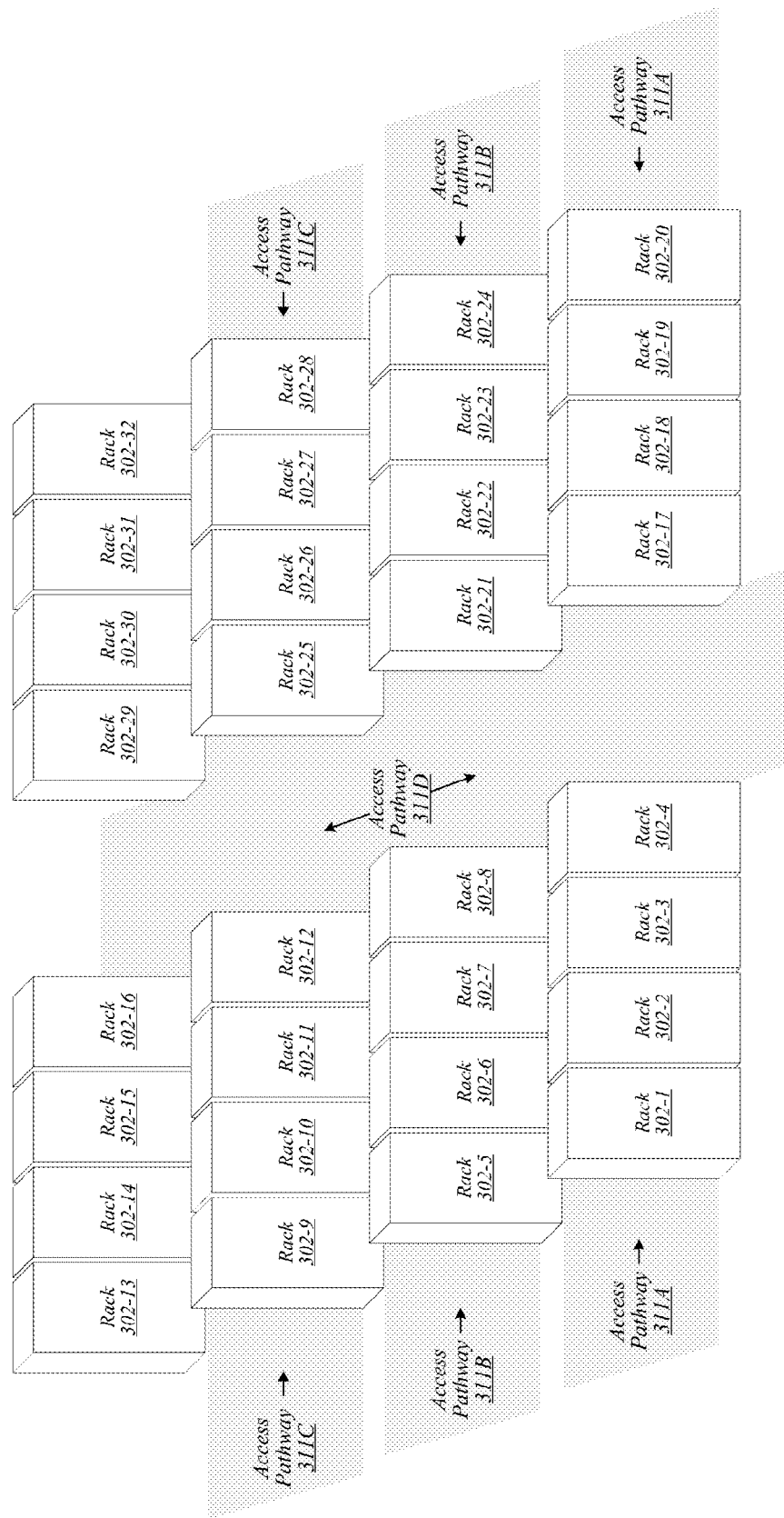
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
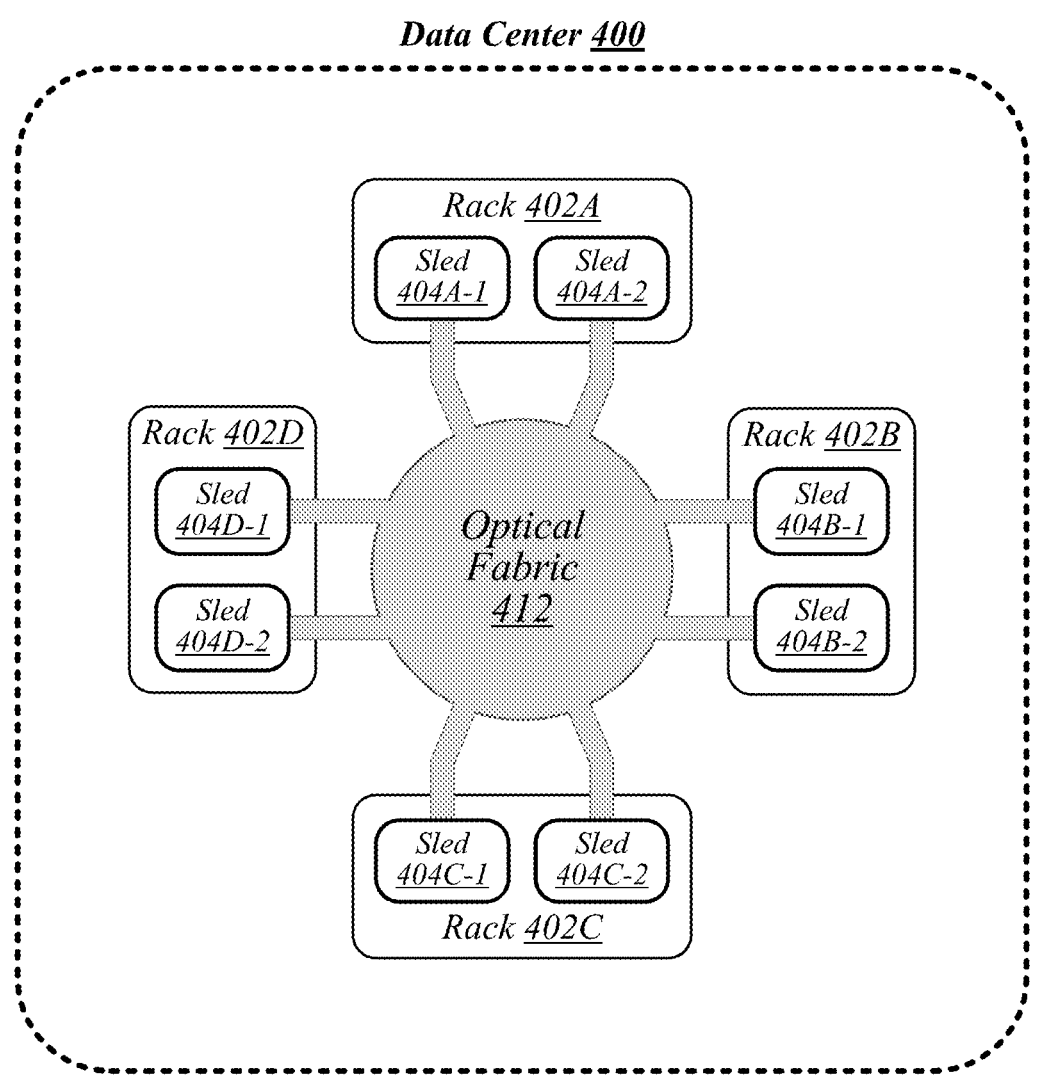
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
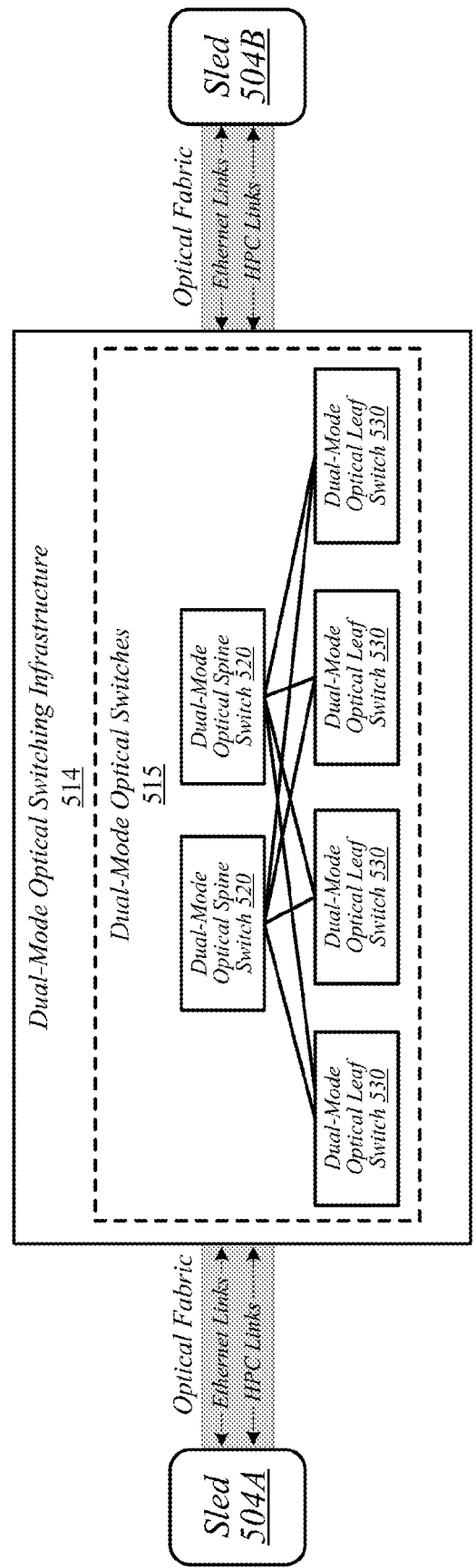
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
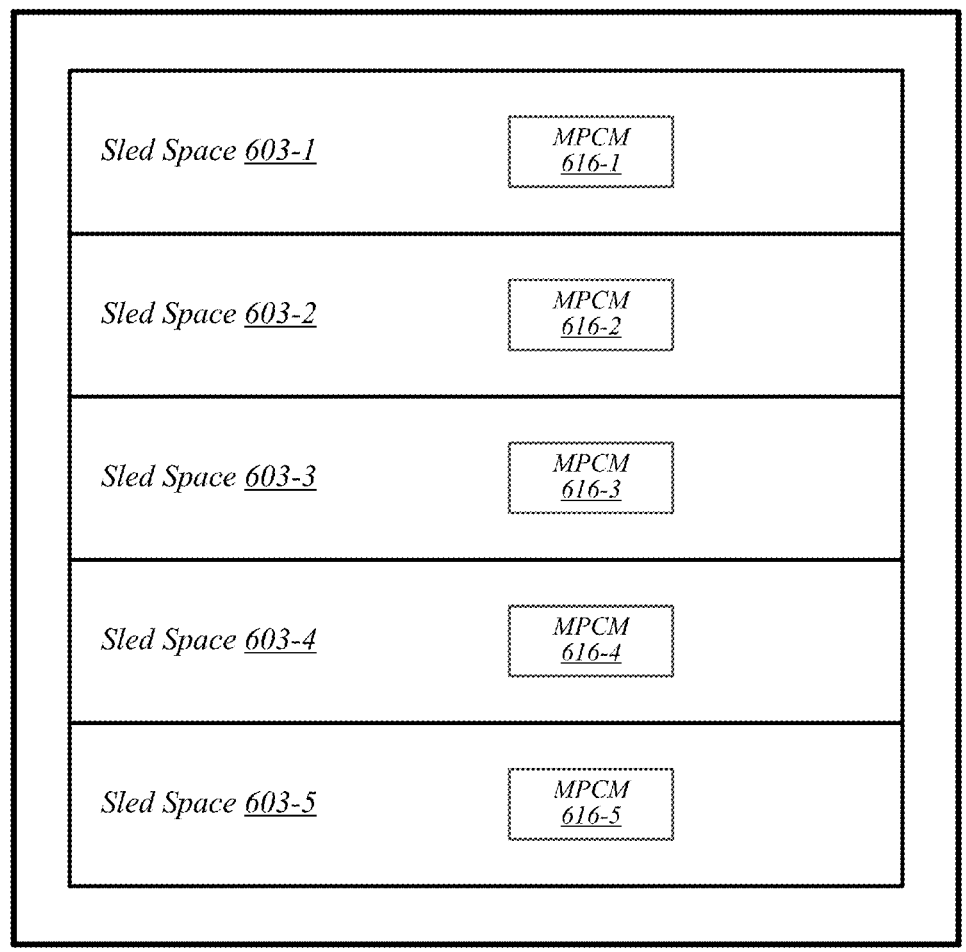
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
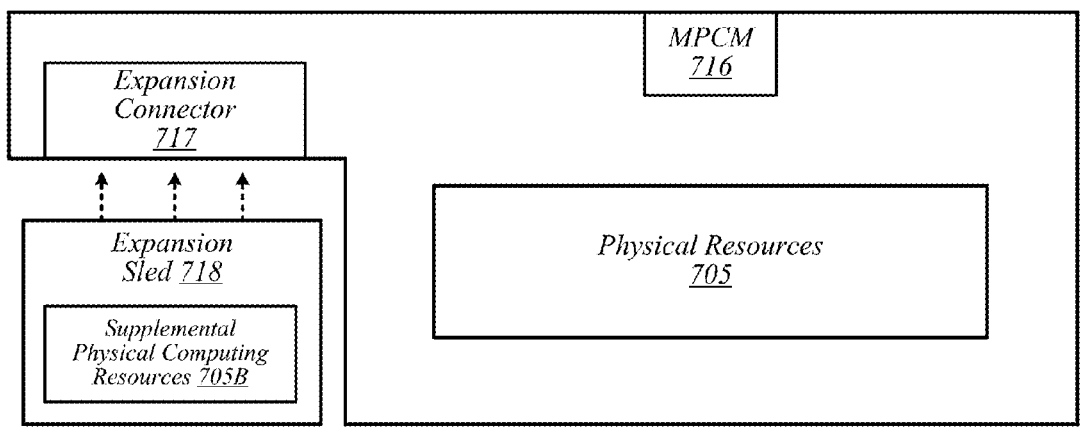
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
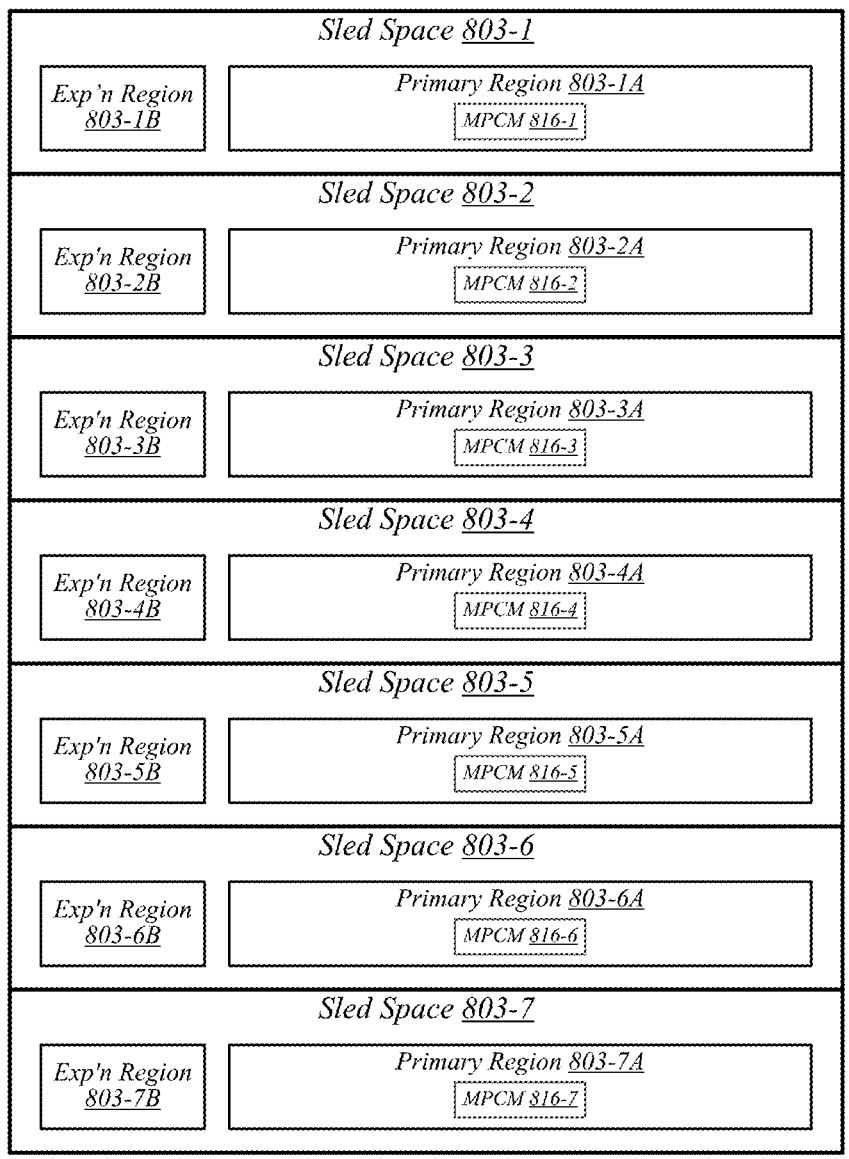
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
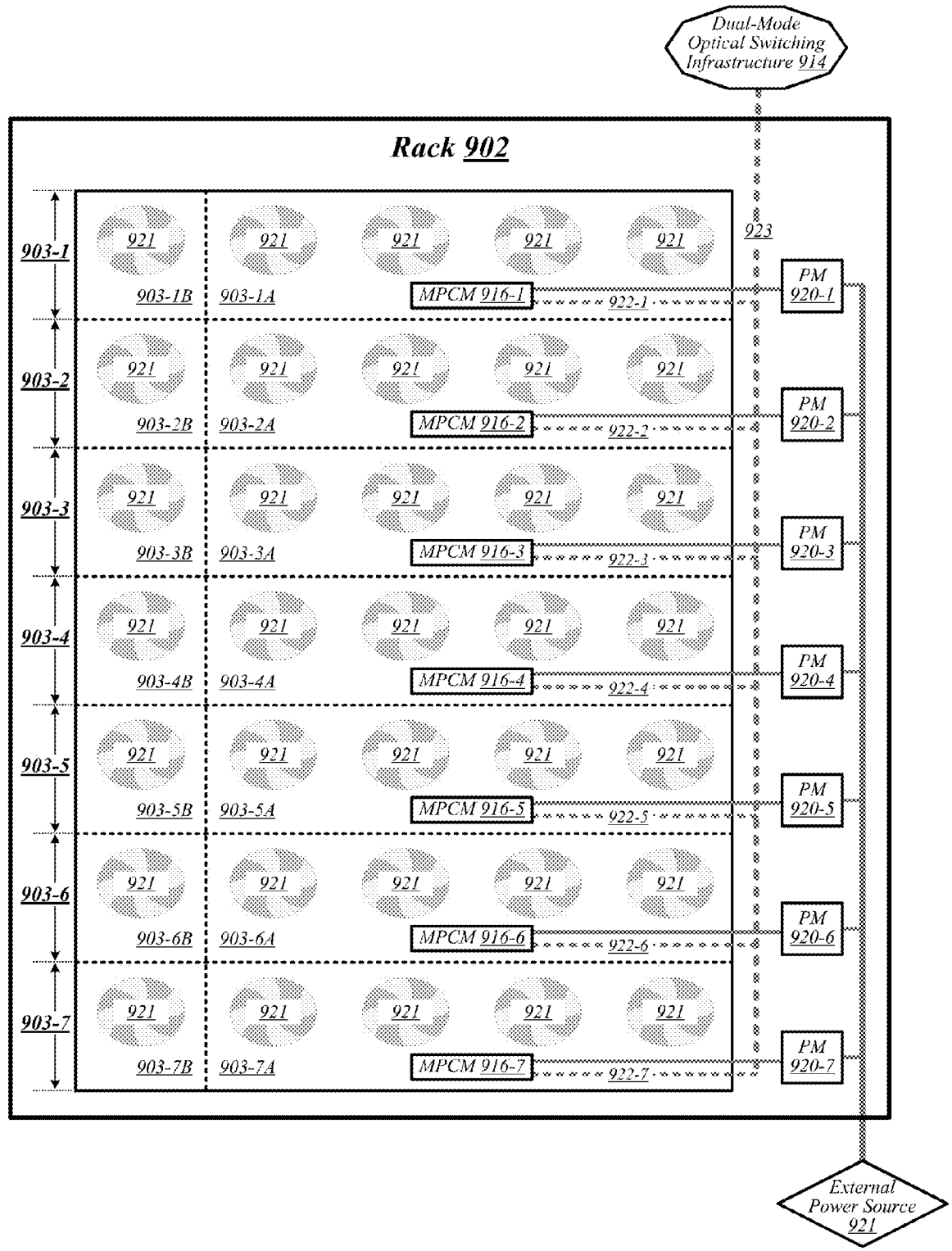
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
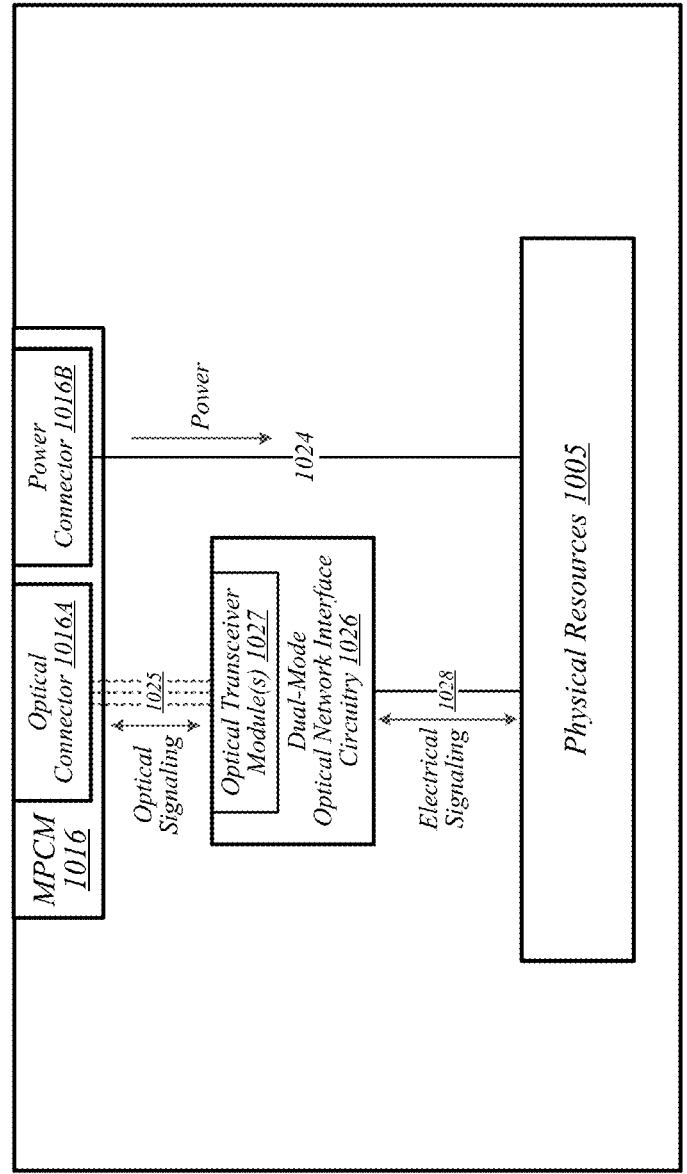
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
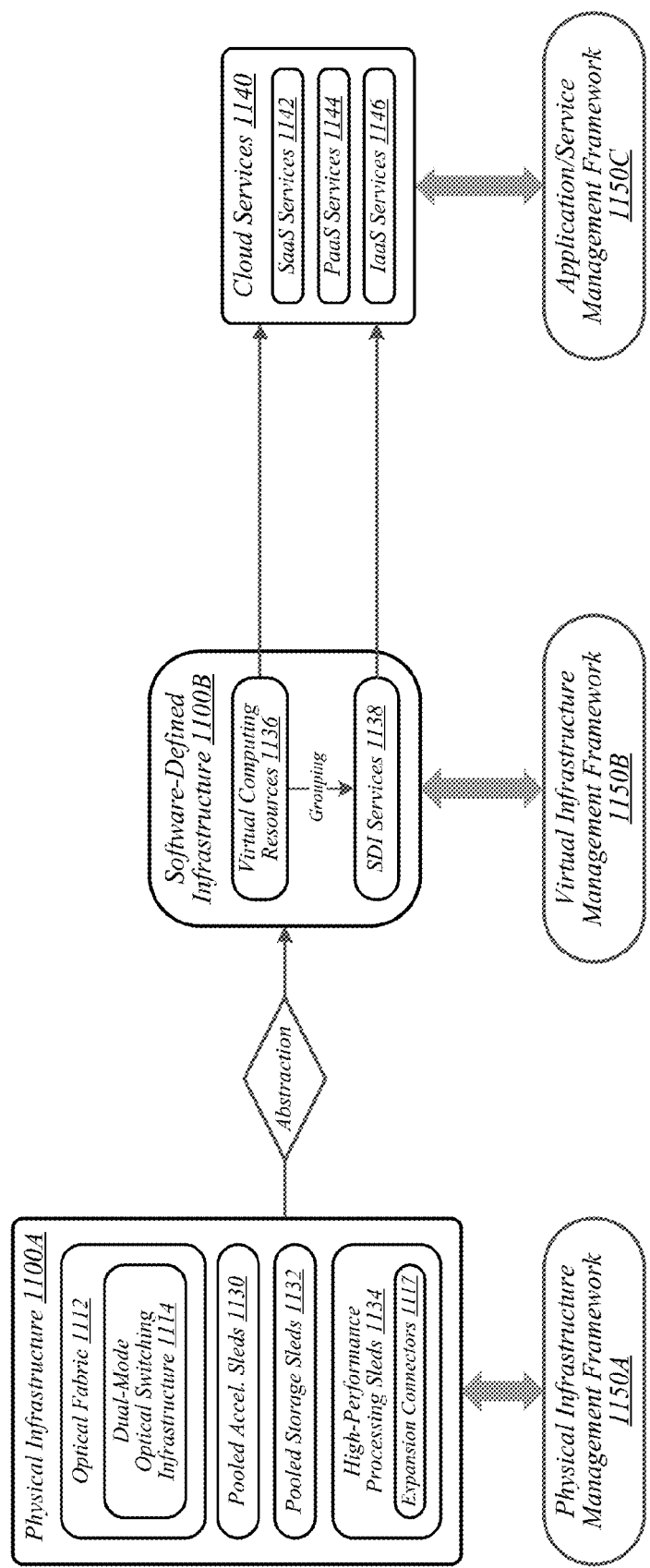
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Referring now to FIGS. 12-15, in some embodiments, each sled 204 of each of several racks 302 may be connected to the same network switch 1202 by one or more optical cables 1204. It should be appreciated that the bandwidth of the optical cables 1204 can be much higher than electrical cables, and since the loss per unit length may be much lower in optical cables 1204 than high-bandwidth electrical cables, the optical cables 1204 can be much longer than high-bandwidth electrical cables. For those reasons, using electrical cables to carry high-bandwidth signals to a centralized network switch 1202 from a large number of racks 302 may be impractical (if not impossible) if for no other reason than the distances involved.

Connecting all of the optical cables 1204 from each sled 204 from each of several racks 302 to the same network switch 1202 allows for low-latency communication from each sled 204 to each other sled 204, since there is only one switch that needs to be traversed for any communication. Such a configuration may allow for improved performance of certain large-scale computing tasks.

Additionally, in the illustrative embodiment, each of the optical cables 1204 is embodied as a passive optical cable. In other words, the signal is carried through the optical cable 1204 entirely as an optical signal, and is not converted to or from an electrical signal at any point in the cable. In contrast, a typical active optical cable may have an optical-to-electrical transceiver integrated into one or both ends of the cable, allowing the cable to employ an electrical interface instead of an optical interface. Additionally, it should be appreciated that passive optical cables, such as the optical cables 1204, are not limited by the fixed bandwidth of the optical-to-electrical transceiver in active optical cables, which typically have a much lower bandwidth than the inherent bandwidth of the optical fiber of the optical cable 1204. Because of this property, a sled 204 can be upgraded to use a higher bandwidth without changing the corresponding optical cable 1204. For example, a sled 204 may be used for a long period of time (such as over 6 months or over 2 years) with a certain bandwidth capability, and then swapped out for an upgraded sled 204 at a higher bandwidth capability, such as at least twice the bandwidth capability of the previous sled, without changing the optical cable 1204.

Figure 12:
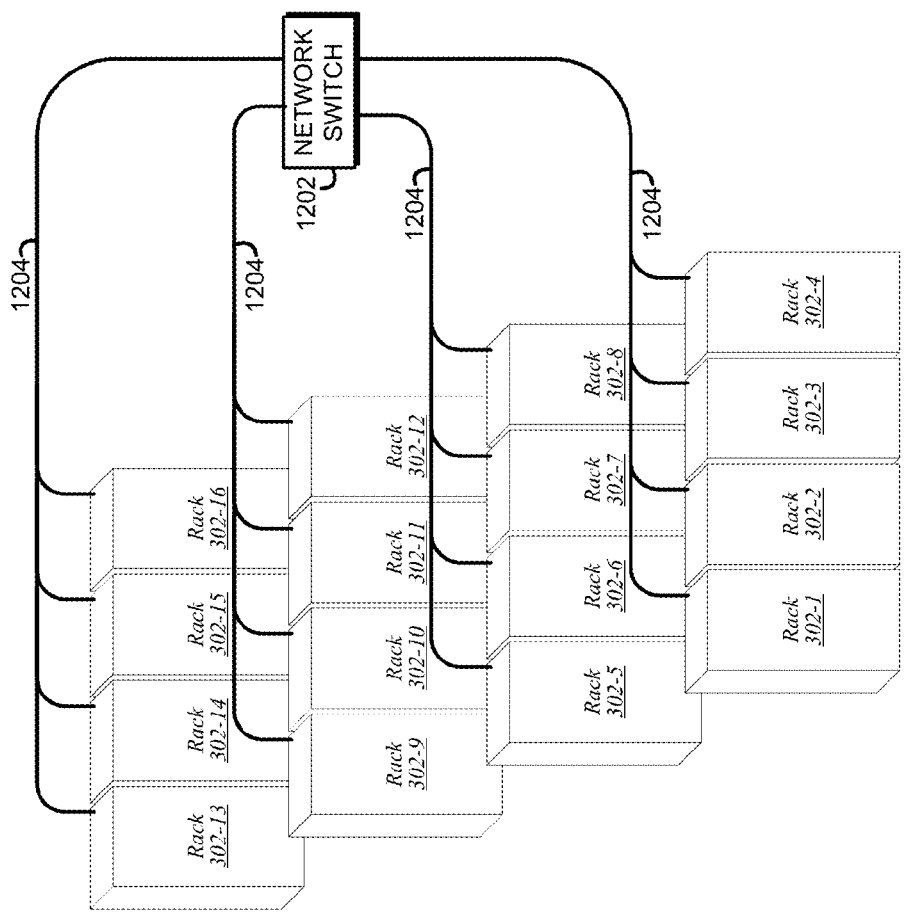
FIG. 12 is a diagram of an example embodiment of a data center in which each sled from several racks is connected to a single switch.

Referring now to FIG. 12, the illustrative data center 300 has several racks 302, each of which includes several sleds 204 (not explicitly shown in FIG. 12), and a network switch 1202. The data center 300 may include any number of racks 302 and/or sleds 204. In the illustrative embodiment, the data center 300 may include 64 racks 302, each with 16 sleds 204 connected to the same network switch 1202, for a total of 1,024 sleds 204 connected to the same network switch 1202. In other embodiments, the data center 300 may have more, fewer than, or equal to 2, 4, 8, 16, 32, 64, 128, 256 racks 302, with each rack 304 having more than, fewer than, or equal to 2, 4, 8, 16, 32, or 64 sleds 204, with each of those sleds 204 connected to the same network switch 1202.

The network switch 1202 is connected to each of the sleds 204 of the data center 300 through one or more optical cables 1204 connected to one or more optical connectors on the network switch 1202. The network switch 1202 may be implemented with any switching technology capable of performing the functionality described herein. In the illustrative embodiment, the network switch 1202 may employ silicon photonics (including silicon photonics integrated with silicon electronics on a single chip) to convert an incoming optical signal from one of the sleds 204 into an electrical signal for internal routing, and may employ optical multiplexers, photodiodes, and other silicon photonics components. Once converted to an electrical signal, the network switch 1202 may determine the destination of the received signal using standard routing techniques. The illustrative network switch 1202 may generate an electrical signal to send an outgoing optical signal to one of the sleds 204 using lasers, optical multiplexers, modulators, and other silicon photonics components. In some embodiments, the network switch 1202 may perform all-optical routing, without ever converting the optical signal to an electrical signal.

The per-port bandwidth of the network switch 1202 may be defined as any bandwidth suitable for reaching the required performance levels, such as more than, less than, or equal to 12.5 gigabits per second (Gbps), 25 Gbps, 50 Gbps, 100 Gbps, 150 Gbps, 200 Gbps, 500 Gbps, 1,000, Gbps, or 2,000 Gbps. The network switch 1202 may be blocking or non-blocking. In the illustrative embodiment, the network switch 1202 has a per-port bandwidth of 200 Gbps and is non-blocking. That is, each optical cable 1204 connected to a sled 204 and to the network switch 1202 may be carrying 200 Gbps to and from that sled simultaneously. It should be appreciated that the rates indicated above are the raw signal rates, and useful communication rates may be lower due to overhead depending on the communication protocol being used.

In the illustrative embodiment, the switching latency of the network switch 1202 is substantially the same for a signal sent from any sled 204 to any other sled 204 (i.e., the time between when the signal reaches the network switch 1202 from the source sled 204 and when the signal leaves the network switch 1202 to the destination sled 204 is substantially the same, regardless of the source sled 204 and destination sled 204). The switching latency may be any value capable of reaching the required performance levels, such as more than, less than, or equal to, 100 ns, 200 ns, 500 ns, 750 ns, 1,000 ns, 1,500 ns, or 2,000 ns. In the illustrative embodiment, the length of each optical cable 1204 is substantially the same, so the latency between any two sleds 204 is substantially the same. In some embodiments, the length of each optical cable 1204 may be different lengths, e.g., sleds 204 closer to the switch may be connected by shorter optical cables 1204. Of course, in such embodiments, the total latency in communicating between two sleds 204 would depend on the length of the optical cables 1204 connected to those sleds 204 as well as the switching latency. In the illustrative embodiment, the latency in communicating between any two sleds 204 is less than 1,000 ns, and the maximum optical cable 1204 length is 25 meters.

The optical cable 1204 may be embodied as any type of optical cable suitable for carrying the optical signals at any appropriate wavelength. The optical cable 1204 includes one or more optical fibers to carry the optical signal. In the illustrative embodiment, each sled 204 is connected to one optical cable 1204 that has 8 fibers, 4 of which may be used for sending signals from the network switch 1202 to the sled 204 and 4 of which may be used for sending signals from the sled 204 to the network switch 1202. Of course, in other embodiments, the optical cable 1204 connected to the sled 204 may have more or fewer fibers, such as more than, fewer than, or equal to, 2, 4, 8, 16, 32, or 64. It should be appreciated that which fiber is used for sending data from the network switch 1202 to the sled 204 as opposed to from the sled 204 to the network switch 1202 is arbitrary, and may vary depending on the configuration of the sled 204 and/or network switch 1202. In some embodiments, a single fiber may be used for carrying a signal both from the sled 204 to the network switch 1202 and from the network switch 1202 to the sled simultaneously. In the illustrative embodiment, all of the optical fibers in optical cable 1204 are connected to the sled 204 through a single connector.

In the illustrative embodiment, each optical cable 1204 runs from each sled 204 to the network switch 1202 as a separate cable from any other optical cable 1204. At the end of the optical cable 1204 that is connected to the network switch 1202, each optical fiber in the optical cable 1204 may have its own connector, or all of the optical fibers connected to the same sled 204 may be grouped together into a single connector, which may be a different type of connector as from the end of the optical cable 1204 that connects to a sled 204. In some embodiments, the optical cables 1204 that connect to the sleds 204 in the same rack 302 may be bundled together (such as with a jacket) at some point, such as at a top of the rack 302. In such embodiments, the optical cables 1204 that are bundled together may interface with the network switch 1202 using, e.g., a single connector or a different connector for each sled 1204 to which the optical cables 1204 are connected.

The optical fiber in the optical cable 1204 may be embodied as any type of optical fiber capable of carrying the optical signals at any appropriate wavelength. In the illustrative embodiment, the wavelengths used are between 1 micrometers and 2 micrometers, but, in some embodiments, other wavelengths in the near UV to near IR range may be used, i.e., 300 nm to 3 micrometers (it should be appreciated that the given values for wavelengths are the vacuum wavelengths, and the wavelengths in the optical cable 1204 will be shorter and depend on the index of refraction of the optical cable 1204). The illustrative optical fiber may be standard single- or multi-mode fiber made from glass. In some embodiments, the optical fibers of the optical cable 1204 may be made from a material different from glass, such as plastic.

It should be appreciated that, in some embodiments, the data center 300 may include sleds 204 and racks 302 that are not directly connected to the network switch 1202. For example, the data center 300 may include several network switches 1202, with each switch connected to a large number of sleds 204. The sleds 204 connected directly to the same network switch 1202 may be grouped together as a unit called a pod. The data center 300 may include several pods, or may include additional computational resources organized in a different manner. Of course, the various network switches 1202 of the data center 300 may all be connected to each other, allowing for communication between a first sled 204 connected to a first network switch 1202 and a second sled connected to a second network switch 1202 (although such communication may be higher latency and/or lower bandwidth than communication between sleds 204 connected to the same network switch 1202).

Figure 13:
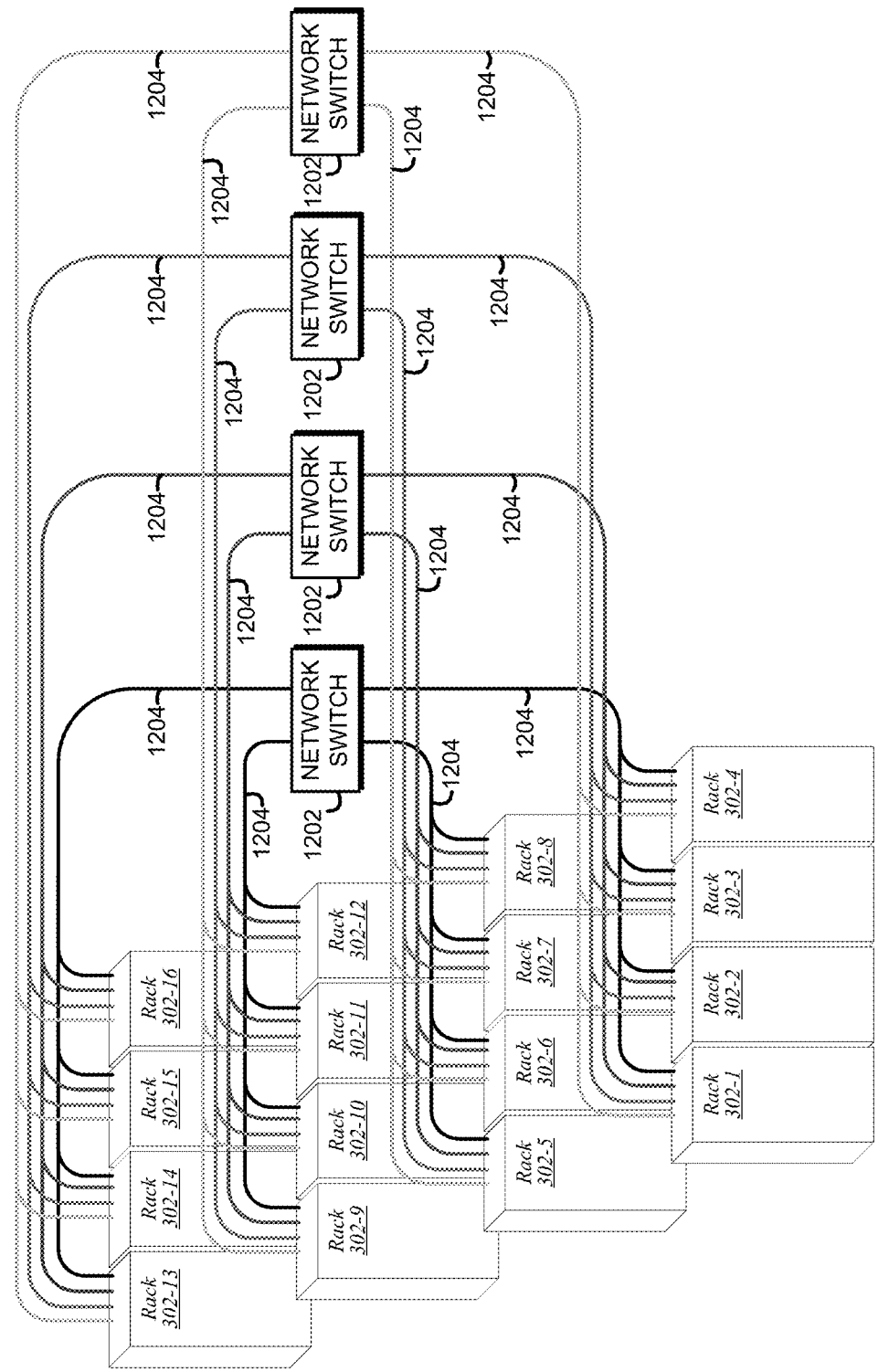
FIG. 13 is a diagram of an example embodiment of a data center in which each sled from several racks is connected to several switches.

Referring now to FIG. 13, the data center 300 may include more than one network switch 1202 connecting the sleds 204 of a pod of racks 302 together, such as four network switches 1202 as shown in the figure. In the embodiment shown in FIG. 13, each sled 204 is connected to each network switch 1202 through an optical cable 1204. The different shaded lines indicate which network switch 1202 an optical cable 1204 is connected to, but does not necessarily indicate any other physical difference such as a different type of cable. Each of the four network switches 1202 form a part of a network that is effectively independent from each other network, allowing the sleds 204 to which they are connected to communicate at a higher rate than if only one of the network switches 1202 was present. It should be appreciated that because multiple network switches 1202 are used, communication is not completely interrupted upon failure of a single component (i.e., failure of a single network switch 1202), but would only be degraded if one of multiple network switches 1202 failed. Further details regarding how the optical cables 1204 from different network switches 1202 may be connected to the same sled are described below in regard to FIG. 15. The data center 300 may include any number of network switches 1202 that are each connected to each of the sleds 204 in a given pod, such as more than, fewer than, or equal to 2, 4, 8, or 16.

Figure 14B:
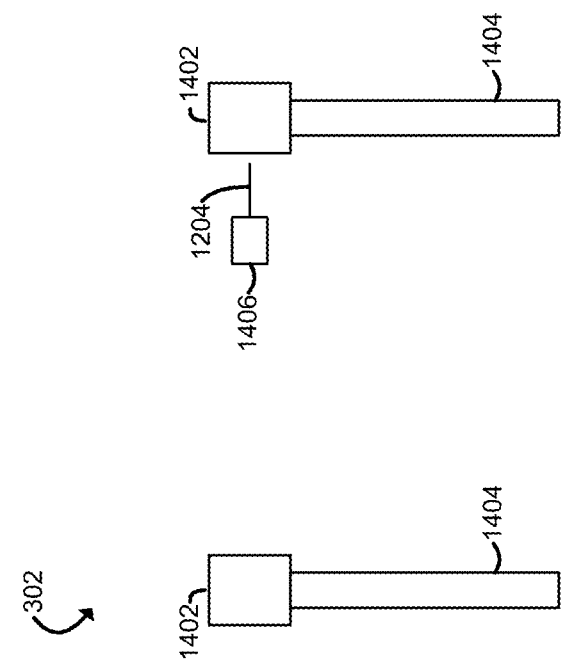
FIGS. 14A and 14B are a diagram of an example embodiment of a rack from the example data center of FIG. 12.
Figure 14A:
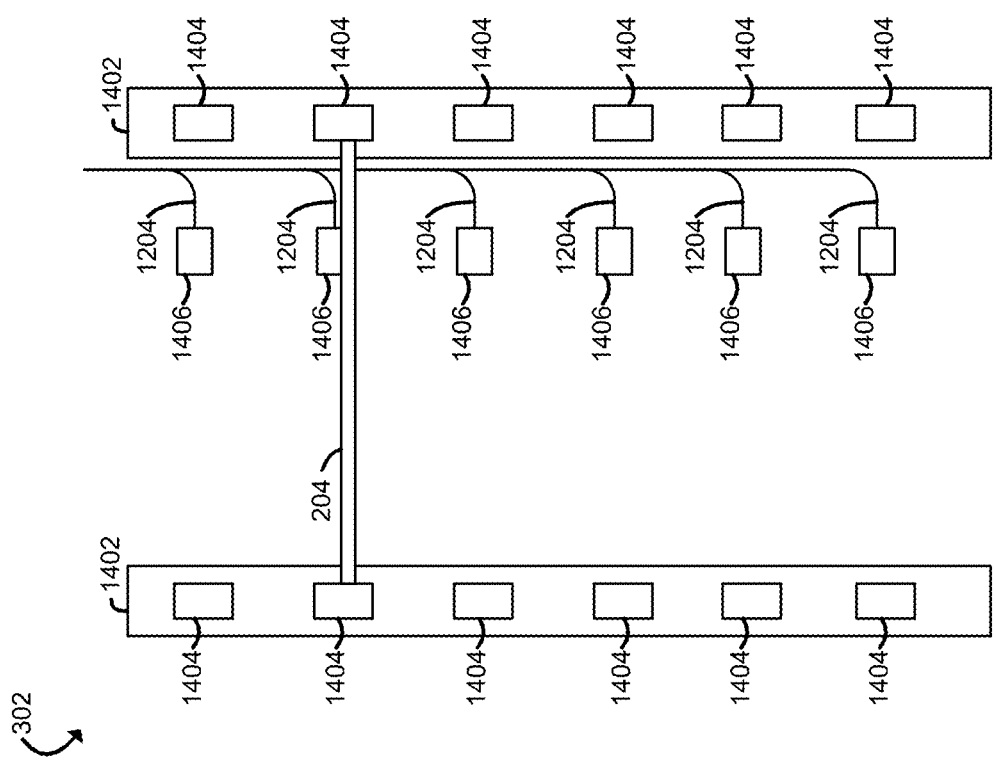

Referring now to FIGS. 14A and 14B (which illustrate the same embodiment from a front-facing and top-down view, respectively), an illustrative rack 302 of the data center 300 shown in FIG. 12 includes two support posts 1402 and several support arms 1404. It should be appreciated that, in some embodiments, a support post 1402 may support more than one rack 302 by being the left support post 1402 for one rack 302 and the right support post 1402 for the adjacent rack 302. Each pair of support arms 1404 that are the same distance from the ground form a sled space between them, into which a sled 204 may be inserted, as shown in one sled space in FIG. 14A. An optical cable 1204 runs from the same network switch 1202 to each sled space and ends with an optical connector 1406 which can mate with a corresponding component on the sled 204 to connect the sled 204 to the network switch 1202 through the optical cable 1204. In the illustrative embodiment, the optical connector 1406 is embodied as a blind-mating connector that may automatically be mated with the sled 204 when the sled is placed into the sled space formed by the support arms 1404. As shown in the illustrative embodiment of FIGS. 14A and 14B, the optical cables 1204 may run alongside the support post 1402. In some embodiments, the optical cables 1204 may run inside a hollow opening of the support post 1402. Of course, not every component of the rack 302 is shown in FIGS. 14A and 14B, and the rack 302 may include additional elements such as mechanical support for the optical connectors 1406, power supplies, additional cables, etc.

Figure 15:
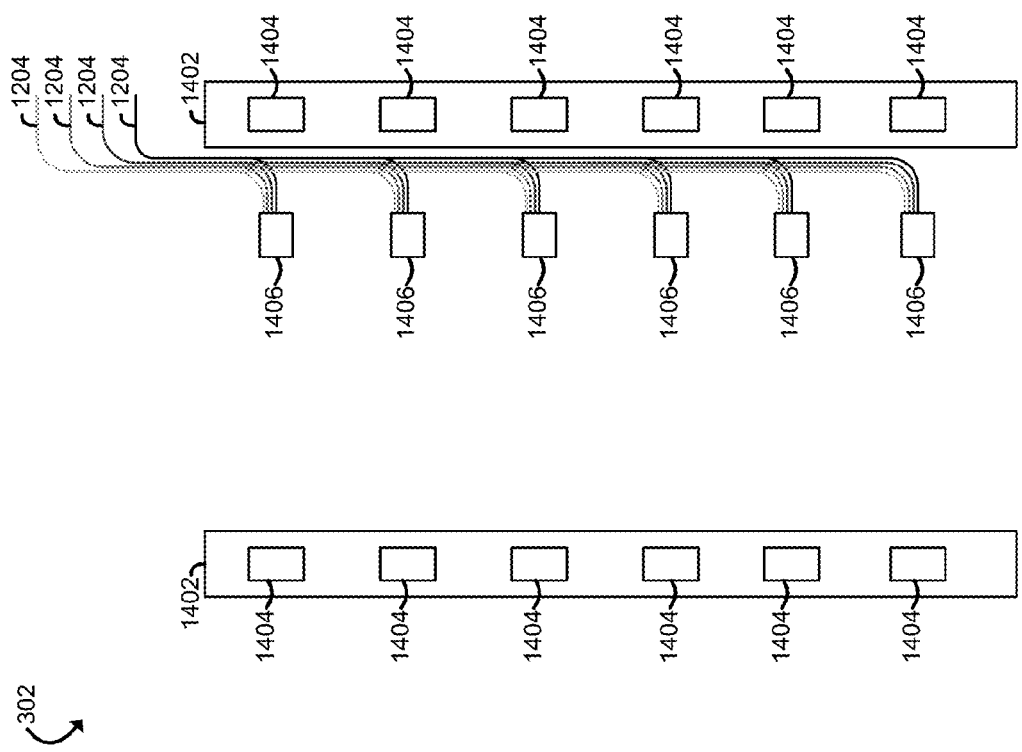
FIG. 15 is a diagram of an example embodiment of a rack from the example data center of FIG. 13.

Referring now to FIG. 15, an illustrative rack 302 of the data center 300 shown in FIG. 13 includes two support posts 1402 and several support arms 1404, as in FIGS. 14A and 14B. FIG. 15 is a front-facing view, similar to FIG. 14A. The embodiment of the data center 300 shown in FIG. 13 includes multiple network switches 1202 connected to each sled 204, and, correspondingly, FIG. 15 shows multiple optical cables 1204 connectable to each sled 204 through an optical connector 1406. In the illustrative embodiment, each optical cable 1204 running from a different network switch 1202 to the same sled 204 is a separate cable, which meet at the optical connector 1406, which allows for the sled 204 to connect to each of the optical cables 1204 through a single optical connector 1406. In other embodiments, each optical cable 1204 running from a different network switch 1202 to the same sled 204 may be a separate cable and have a separate optical connector 1406 from each other optical cable 1204 (i.e., there would be four separate optical connectors 1406 side-by-side for each sled 204, instead of the one shown in FIG. 15). In still other embodiments, the optical cables 1204 running to each sled may be bundled together for a certain length, such as to the top of the rack 302, and then split into one cable for each network switch 1202. The optical cables 1204 running from the various sleds 204 from a single rack 302 to the same network switch 1202 may or may not be bundled together in some manner. It should be appreciated that, as discussed above, because of the multiple network switches 1202 and multiple optical cables 1204 are used for each sled 204, communication is not completely interrupted upon failure of a single component (i.e., failure of a single network switch 1202), but would only be degraded if one of multiple network switches 1202 failed. In the illustrative embodiment, each physical resource on the sled 204 that may need to communicate using the network is connected to each of the optical cables 1204 connected to the sled 204.

EXAMPLES

Illustrative examples of the devices, systems, and methods disclosed herein are provided below. An embodiment of the devices, systems, and methods may include any one or more, and any combination of, the examples described below. Example 1 includes a data center comprising a network switch comprising a plurality of optical connectors; a plurality of sleds, each sled of the plurality of sleds comprising a circuit board, an optical connector mounted on the circuit board, and one or more physical resources mounted on the circuit board; a plurality of passive optical cables, wherein each passive optical cable of the plurality of passive optical cables comprises at least two optical fibers; a first connector at a first end of the passive optical cable connected to the optical connector of a corresponding sled of the plurality of sleds; and a second connector at a second end of the passive optical cable connected to an optical connector of the plurality of optical connectors of the network switch.

Example 2 includes the subject matter of Example 1, and wherein the plurality of sleds comprises at least 256 sleds.

Example 3 includes the subject matter of any of Examples 1 and 2, and wherein the plurality of sleds comprises at least 1,024 sleds.

Example 4 includes the subject matter of any of Examples 1-3, and wherein each of the plurality of sleds is configured to send and receive optical signals over the corresponding passive optical cables at a rate of at least 50 gigabits per second and wherein the network switch is configured to send and receive optical signals over each of the plurality of passive optical cables at a rate of at least 50 gigabits per second.

Example 5 includes the subject matter of any of Examples 1-4, and wherein the network switch is non-blocking.

Example 6 includes the subject matter of any of Examples 1-5, and wherein each of the plurality of sleds is configured to send and receive optical signals over the corresponding passive optical cables at a rate of at least 200 gigabits per second and wherein the network switch is configured to send and receive optical signals over each of the plurality of passive optical cables at a rate of at least 200 gigabits per second.

Example 7 includes the subject matter of any of Examples 1-6, and wherein the network switch is non-blocking.

Example 8 includes the subject matter of any of Examples 1-7, and wherein a switching latency of the network switch is substantially the same for communication from any sled of the plurality of sleds to any other sled of the plurality of sleds.

Example 9 includes the subject matter of any of Examples 1-8, and wherein the switching latency is less than 1,000 nanoseconds.

Example 10 includes the subject matter of any of Examples 1-9, and further including a plurality of racks, each rack comprising a plurality of support posts, wherein each rack of the plurality of racks comprises two or more of the plurality of sleds, and wherein the passive optical cables connected to the sleds of each rack are bundled together from the top of that rack to the network switch.

Example 11 includes the subject matter of any of Examples 1-10, and further including at least three additional network switches and at least three additional pluralities of passive optical cables, each additional plurality of passive optical cables corresponding to an additional network switch, wherein each passive optical cable of each additional plurality of passive optical cables comprises at least two optical fibers; a first connector at a first end of the passive optical cable connected to the optical connector of a corresponding sled of the plurality of sleds; and a second connector at a second end of the passive optical cable connected to an optical connector of the plurality of optical connectors of the corresponding additional network switch.

Example 12 includes the subject matter of any of Examples 1-11, and wherein each of the plurality of sleds is configured to send and receive optical signals over the corresponding additional passive optical cables at a rate of at least 50 gigabits per second and wherein each additional network switch is configured to send and receive optical signals over each of the corresponding additional passive optical cables at a rate of at least 50 gigabits per second.

Example 13 includes the subject matter of any of Examples 1-12, and wherein each additional network switch is non-blocking.

Example 14 includes the subject matter of any of Examples 1-13, and wherein each of the plurality of sleds is configured to send and receive optical signals over the corresponding additional passive optical cables at a rate of at least 200 gigabits per second and wherein each additional network switch is configured to send and receive optical signals over each of the corresponding additional passive optical cables at a rate of at least 200 gigabits per second.

Example 15 includes the subject matter of any of Examples 1-14, and wherein each additional network switch is non-blocking.

Example 16 includes the subject matter of any of Examples 1-15, and wherein each one or more physical resources of each sled of the plurality of sleds comprise a compute device, a memory device, or a storage device.

Example 17 includes a method for configuring a data center, the method comprising connecting a plurality of passive optical cables from each of a plurality of sleds of the data center to a network switch of the data center, wherein connecting the plurality of passive optical cables comprises, for each passive optical cable of the plurality of passive optical cables, connecting a first connector located at a first end of a corresponding passive optical cable to an optical connector of a corresponding sled of the plurality of sleds and connecting a second connector located at a second end of the corresponding passive optical cable to a corresponding optical connector of network switch.

Example 18 includes the subject matter of Example 17, and wherein the plurality of sleds comprises at least 256 sleds.

Example 19 includes the subject matter of any of Examples 17 and 18, and wherein the plurality of sleds comprises at least 1,024 sleds.

Example 20 includes the subject matter of any of Examples 17-19, and wherein each of the plurality of sleds is configured to send and receive optical signals over the corresponding passive optical cables at a rate of at least 50 gigabits per second and wherein the network switch is configured to send and receive optical signals over each of the plurality of passive optical cables at a rate of at least 50 gigabits per second.

Example 21 includes the subject matter of any of Examples 17-20, and wherein the network switch is non-blocking.

Example 22 includes the subject matter of any of Examples 17-21, and wherein each of the plurality of sleds is configured to send and receive optical signals over the corresponding passive optical cables at a rate of at least 200 gigabits per second and wherein the network switch is configured to send and receive optical signals over each of the plurality of passive optical cables at a rate of at least 200 gigabits per second.

Example 23 includes the subject matter of any of Examples 17-22, and wherein the network switch is non-blocking.

Example 24 includes the subject matter of any of Examples 17-23, and wherein a switching latency of the network switch is substantially the same for communication from any sled of the plurality of sleds to any other sled of the plurality of sleds.

Example 25 includes the subject matter of any of Examples 17-24, and wherein the switching latency is less than 1,000 nanoseconds.

Example 26 includes the subject matter of any of Examples 17-25, and wherein the data center comprises a plurality of racks, each rack comprising a plurality of support posts, wherein each rack of the plurality of racks comprises two or more of the plurality of sleds, and wherein the passive optical cables connected to the sleds of each rack are bundled together from the top of that rack to the network switch.

Example 27 includes the subject matter of any of Examples 17-26, and further including connecting at least three additional pluralities of passive optical cables from the plurality of sleds to at least three additional network switches of the data center, each additional plurality of passive optical cables corresponding to an additional network switch of the at least three additional network switches, wherein connecting the at least three additional pluralities of passive optical cables comprises, for each passive optical cable of each of the at least three additional pluralities of passive optical cables, connecting a first connector located at a first end of a corresponding passive optical cable to an optical connector of a corresponding sled of the plurality of sleds and connecting a second connector located at a second end of the corresponding passive optical cable to a corresponding optical connector of the corresponding additional network switch.

Example 28 includes the subject matter of any of Examples 17-27, and wherein each of the plurality of sleds is configured to send and receive optical signals over the corresponding additional passive optical cables at a rate of at least 50 gigabits per second and wherein each additional switch is configured to send and receive optical signals over each of the corresponding additional passive optical cables at a rate of at least 50 gigabits per second.

Example 29 includes the subject matter of any of Examples 17-28, and wherein each additional network switch is non-blocking.

Example 30 includes the subject matter of any of Examples 17-29, and wherein each of the plurality of sleds is configured to send and receive optical signals over the corresponding additional passive optical cables at a rate of at least 200 gigabits per second and wherein each additional switch is configured to send and receive optical signals over each of the corresponding additional passive optical cables at a rate of at least 200 gigabits per second.

Example 31 includes the subject matter of any of Examples 17-30, and wherein each additional network switch is non-blocking.

Example 32 includes the subject matter of any of Examples 17-31, and further including operating each of the plurality of sleds and the at least three additional network switches while the network switch is not functioning.

Example 33 includes the subject matter of any of Examples 17-32, and further including operating, for at least six months, each of the plurality of sleds, wherein each of the plurality of sleds is configured to send and receive optical signals over the corresponding passive optical cables at a first bandwidth rate; and upgrading each of the plurality of sleds to send and receive optical signals over the corresponding passive optical cables at a second bandwidth rate that is at least twice the first bandwidth rate without upgrading the corresponding passive optical cables.

The invention claimed is:

1. A system comprising:
a plurality of network switches, each network switch of the plurality of network switches comprising a plurality of optical connectors;
a plurality of sleds, each sled of the plurality of sleds comprising a circuit board, an optical connecter mounted on the circuit board, and one or more physical resources mounted on the circuit board;
a plurality of passive optical cables, wherein each passive optical cable of the plurality of passive optical cables comprises:
at least two optical fibers;
a first connector at a first end of the passive optical cable connected to the optical connector of a corresponding sled of the plurality of sleds; and
a second connector at a second end of the passive optical cable connected to an optical connector of the plurality of optical connectors of a corresponding network switch of the plurality of the network switches,
wherein each of the plurality of sleds is connected to each of the plurality of network switches by at least one of the plurality of passive optical cables.

2. The system of claim 1, wherein the plurality of sleds comprises at least 256 sleds.

3. The system of claim 1, wherein each of the plurality of sleds is configured to send and receive optical signals over the corresponding passive optical cables at a rate of at least 50 gigabits per second and wherein each of the plurality of network switches is configured to send and receive optical signals over each of the plurality of passive optical cables connected to the corresponding network switch at a rate of at least 50 gigabits per second.

4. The system of claim 3, wherein the plurality of sleds comprises at least 256 sleds and wherein each of the plurality of network switches is non-blocking.

5. The system of claim 4, wherein a switching latency of each of the plurality of network switches is substantially the same for communication from any sled of the plurality of sleds to any other sled of the plurality of sleds.

6. The system of claim 5, wherein the switching latency of each of the plurality of network switches is less than 1,000 nanoseconds.

7. The system of claim 3, wherein the plurality of sleds comprises at least 1,024 sleds and wherein each of the plurality of network switches is non-blocking.

8. The system of claim 7, wherein a switching latency of each of the plurality of network switches is substantially the same for communication from any sled of the plurality of sleds to any other sled of the plurality of sleds.

9. The system of claim 8, wherein the switching latency of each of the plurality of network switches is less than 1,000 nanoseconds.

10. The system of claim 1, wherein each of the plurality of sleds is configured to send and receive optical signals over the corresponding passive optical cables at a rate of at least 200 gigabits per second and wherein each of the plurality of network switch is configured to send and receive optical signals over each of the plurality of passive optical cables connected to the corresponding network switch at a rate of at least 200 gigabits per second.

11. The system of claim 1, wherein each of the one or more physical resources is communicatively coupled to each passive optical fiber of the plurality of passive optical fibers.

12. The system of claim 1, wherein a switching latency of each of the plurality of network switches is substantially the same for communication from any sled of the plurality of sleds to any other sled of the plurality of sleds.

13. The system of claim 12, wherein the switching latency of each of the plurality of network switches is less than 1,000 nanoseconds.

14. The system of claim 1, further comprising a plurality of racks, each rack comprising a plurality of support posts, wherein each rack of the plurality of racks comprises two or more of the plurality of sleds, and wherein the passive optical cables connected to the sleds of each rack are bundled together from the top of that rack to the plurality of network switches.

15. The system of claim 1, wherein each sled of the plurality of sleds comprises a compute sled, a memory sled, or a storage sled.

16. A method for configuring a data center, the method comprising:
connecting a plurality of passive optical cables from each of a plurality of sleds of the data center to each of a plurality of network switches of the data center,
wherein connecting the plurality of passive optical cables comprises, for each passive optical cable of the plurality of passive optical cables, connecting a first connector located at a first end of a corresponding passive optical cable to an optical connector of a corresponding sled of the plurality of sleds and connecting a second connector located at a second end of the corresponding passive optical cable to a corresponding optical connector of a corresponding network switch of the plurality of network switches.

17. The method of claim 16, wherein the plurality of sleds comprises at least 256 sleds.

18. The method of claim 16, wherein each of the plurality of sleds is configured to send and receive optical signals over the corresponding passive optical cables at a rate of at least 50 gigabits per second and wherein each of plurality of network switches is configured to send and receive optical signals over each of the plurality of passive optical cables connected to the corresponding network switch at a rate of at least 50 gigabits per second.

19. The method of claim 18, wherein each of the plurality of network switches is non-blocking.

20. The method of claim 19, wherein a switching latency of each of the plurality of network switches is substantially the same for communication from any sled of the plurality of sleds to any other sled of the plurality of sleds.

21. The method of claim 20, wherein the switching latency of each of the plurality of network switches is less than 1,000 nanoseconds.

22. The method of claim 16, wherein each of the plurality of sleds is configured to send and receive optical signals over the corresponding passive optical cables at a rate of at least 200 gigabits per second and wherein each of the plurality of network switchus is configured to send and receive optical signals over each of the plurality of passive optical cables connected to the corresponding network switch at a rate of at least 200 gigabits per second.

23. The method of claim 16, wherein the data center comprises a plurality of racks, each rack comprising a plurality of support posts, wherein each rack of the plurality of racks comprises two or more of the plurality of sleds, and wherein the passive optical cables connected to the sleds of each rack are bundled together from the top of that rack to the plurality of network switches.

24. The method of claim 16, further comprising operating each of the plurality of sleds and at least one of the plurality of network switches while one of the plurality of network switches is not functioning.

25. The method of claim 16, further comprising:
   operating, for at least six months, each of the plurality of sleds, wherein each of the plurality of sleds is configured to send and receive optical signals over the corresponding passive optical cables at a first bandwidth rate; and
   upgrading each of the plurality of sleds to send and receive optical signals over the corresponding passive optical cables at a second bandwidth rate that is at least twice the first bandwidth rate without upgrading the corresponding passive optical cables.

* * * * *